United States Patent
Morita et al.

(10) Patent No.: US 8,981,239 B2
(45) Date of Patent: Mar. 17, 2015

(54) CAPACITOR MODULE

(71) Applicant: Panasonic Corporation, Osaka (JP)

(72) Inventors: Kazuki Morita, Osaka (JP); Tooru Ninomiya, Osaka (JP); Tatehiko Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 215 days.

(21) Appl. No.: 13/661,672

(22) Filed: Oct. 26, 2012

(65) Prior Publication Data

US 2013/0105210 A1    May 2, 2013

(30) Foreign Application Priority Data

Oct. 28, 2011 (JP) ................................. 2011-236889

(51) Int. Cl.
| | |
|---|---|
| *H01G 11/10* | (2013.01) |
| *H01G 9/008* | (2006.01) |
| *H01G 11/82* | (2013.01) |
| *H01G 2/04* | (2006.01) |
| *H01G 11/76* | (2013.01) |

(52) U.S. Cl.
CPC .............. *H01G 11/10* (2013.01); *H01G 9/008* (2013.01); *H01G 11/82* (2013.01); *H01G 2/04* (2013.01); *Y02T 10/7022* (2013.01); *Y02E 60/13* (2013.01); *H01G 11/76* (2013.01)
USPC ....................................................... 174/559

(58) Field of Classification Search
CPC ................................... H01G 9/00; H05K 1/16
See application file for complete search history.

(56) References Cited

U.S. PATENT DOCUMENTS

| | | | | |
|---|---|---|---|---|
| 4,508,411 | A | * | 4/1985 | Hughes et al. ................ 439/391 |
| 5,508,888 | A | * | 4/1996 | Craps ............................ 361/773 |
| 5,771,149 | A | * | 6/1998 | Osaki et al. ................. 361/306.1 |
| 2010/0232130 | A1 | * | 9/2010 | Kodama ........................ 361/811 |
| 2010/0267252 | A1 | | 10/2010 | Fujimoto | |

FOREIGN PATENT DOCUMENTS

| | | |
|---|---|---|
| JP | 08-097090 A | 4/1996 |
| JP | 2008-124244 A | 5/2008 |
| JP | 2009-253009 A | 10/2009 |
| JP | 2009253009 A * | 10/2009 |

* cited by examiner

*Primary Examiner* — Timothy Thompson
*Assistant Examiner* — Krystal Robinson
(74) *Attorney, Agent, or Firm* — McDermott Will & Emery LLP

(57) ABSTRACT

A capacitor body is laterally contained in a lower holder, to be then pressed by an upper holder. A lead wire is led from the capacitor body in an axial direction, and then, bent toward a wiring board, thereby forming a leg soldered to the wiring board. The lower holder includes a first holding portion extending outward and having a supporter disposed in a stationary state whereas the upper holder includes a second holding portion extending outward and having a bridge stretched between a pair of elastically deformable arms. The first and second holding portions are urged toward the capacitor body, and therefore, axially hold a part of the leg of the lead wire. This configuration can prevent any breakage of a soldered portion of the lead wire due to vibrations so as to enhance vibration resistance.

5 Claims, 11 Drawing Sheets

CAPACITOR MODULE

BACKGROUND OF THE INVENTION

1. Field of the Invention

The present invention relates to a capacitor module having a capacitor mounted on a wiring board.

2. Description of the Related Art

Vehicles such as an electric-powered car or a hybrid car have been commercially available in recent years for the purpose of environmental friendliness and fuel economy enhancement. Such vehicles intermittently consume a large amount of current when a stator is driven during use, and therefore, a voltage in a battery temporarily decreases. Consequently, voltages to be supplied to other loads such as audio equipment, a car navigator, and an electronic controller in a vehicular control system also decrease, thereby raising a fear of unstable operation.

Taking measures against that, a capacitor module with a capacitor has been known as an auxiliary power source for sufficiently supplying electric power to loads when a voltage in a battery temporarily decreases.

FIG. 11 is an upward perspective view showing holders that hold capacitors in a capacitor module in the prior art.

In the capacitor module in the prior art, a plurality of capacitors 503 are vertically held between lower holder 501 and upper holder 502. The barrel of each of capacitors 503 is held in the container of lower holder 501, and further, the barrel of capacitor 503 is pressed from above by the press-fitting portion of the container of upper holder 502.

Lead wires 504 are drawn from capacitor 503 through the side surfaces of upper holder 502 and lower holder 501, and then, bent. Moreover, the end of each of lead wires 504 is soldered to wiring board 505.

Note that, for example, Unexamined Japanese Patent Publication No. 2009-253009 is known as the prior art literature information relevant to the invention of this application.

SUMMARY OF THE INVENTION

However, the above-described capacitor module in the prior art has clearances between the barrel of the capacitor and the containers of the upper and lower holders so as to readily contain the capacitor in the upper and lower holders at the time of assembling. These clearances cause vibrations in the barrel of the capacitor due to the vibration of the vehicle, thereby raising problems to be solved such as the rupture of the lead wire in the vicinity of the soldered portion of the lead wire and the breakage of the soldered portion.

The present invention has been accomplished to solve the problems to be solved experienced by the prior art. Therefore, an object of the present invention is to provide a capacitor module having an excellent assembling workability and an improved vibration resistance.

In order to achieve the above-described object, the present invention provides a capacitor module including: a capacitor including a capacitor body and a lead wire to be led from one end of the capacitor body; a lower holder having a first holding portion; an upper holder having a second holding portion; and a wiring board having a board surface, to which the lower holder is secured. The capacitor body is contained in a space defined by the lower holder and the upper holder. The lead wire has a leg bent toward the board surface. The end of the leg of the lead wire is connected to the wiring board. The second holding portion urges the leg of the lead wire toward the capacitor body. The first holding portion and the second holding portion apply a pressing force to a part of the leg of the lead wire in the axial direction of the capacitor.

As described above, according to the present invention, the first and second holding portions urge the leg of the lead wire toward the capacitor body so as to apply a pressing force to a part of the leg in the axial direction. Therefore, it is possible to produce the effects of the suppression of vibrations at the leg of the led wire, the prevention of breakage near to the soldered portion of the lead wire, the enhanced vibration resistance, and the secured excellent assembling workability as well as the suppression of damage on the capacitor during assembling work.

DETAILED DESCRIPTION OF THE PREFERRED EMBODIMENTS

First Exemplary Embodiment

A description will be given below of a capacitor module in a first exemplary embodiment according to the present invention.

Figure 1:
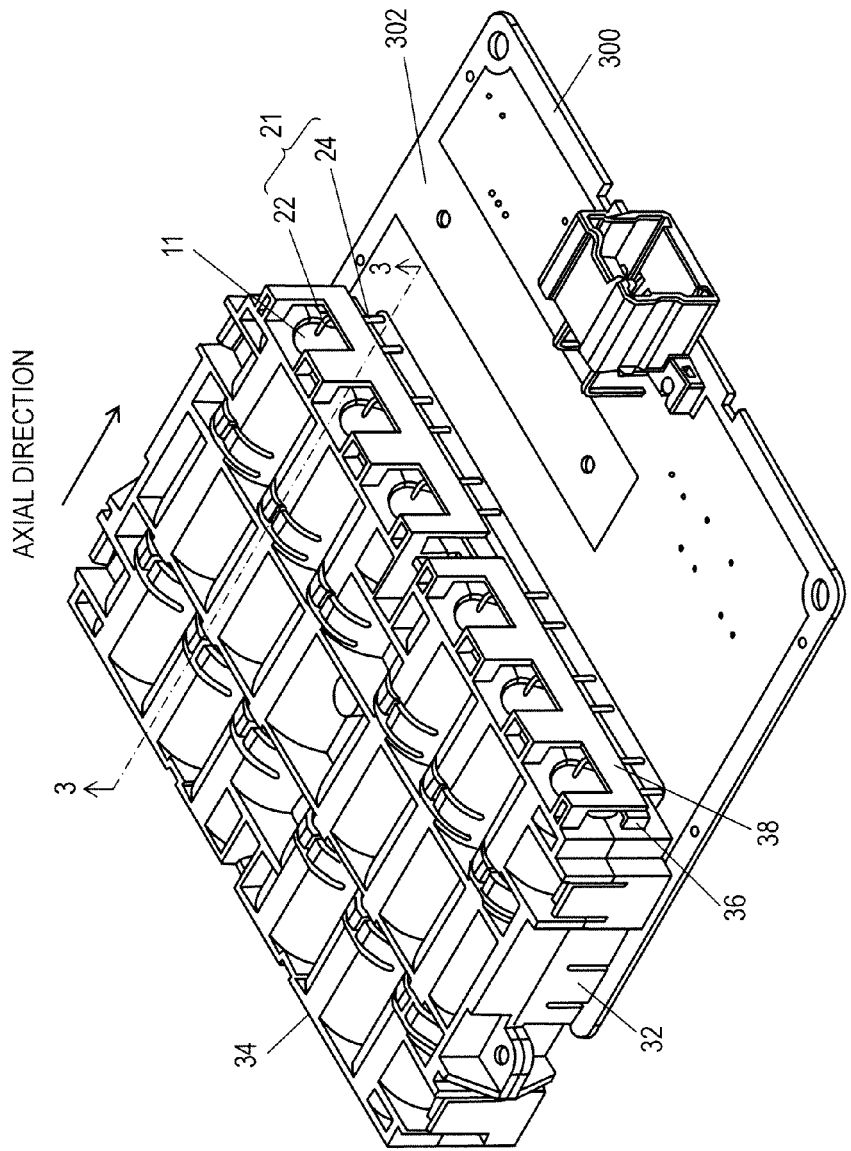
FIG. 1 is an upward perspective view showing a capacitor module contained in holders in a first exemplary embodiment according to the present invention.
Figure 2:
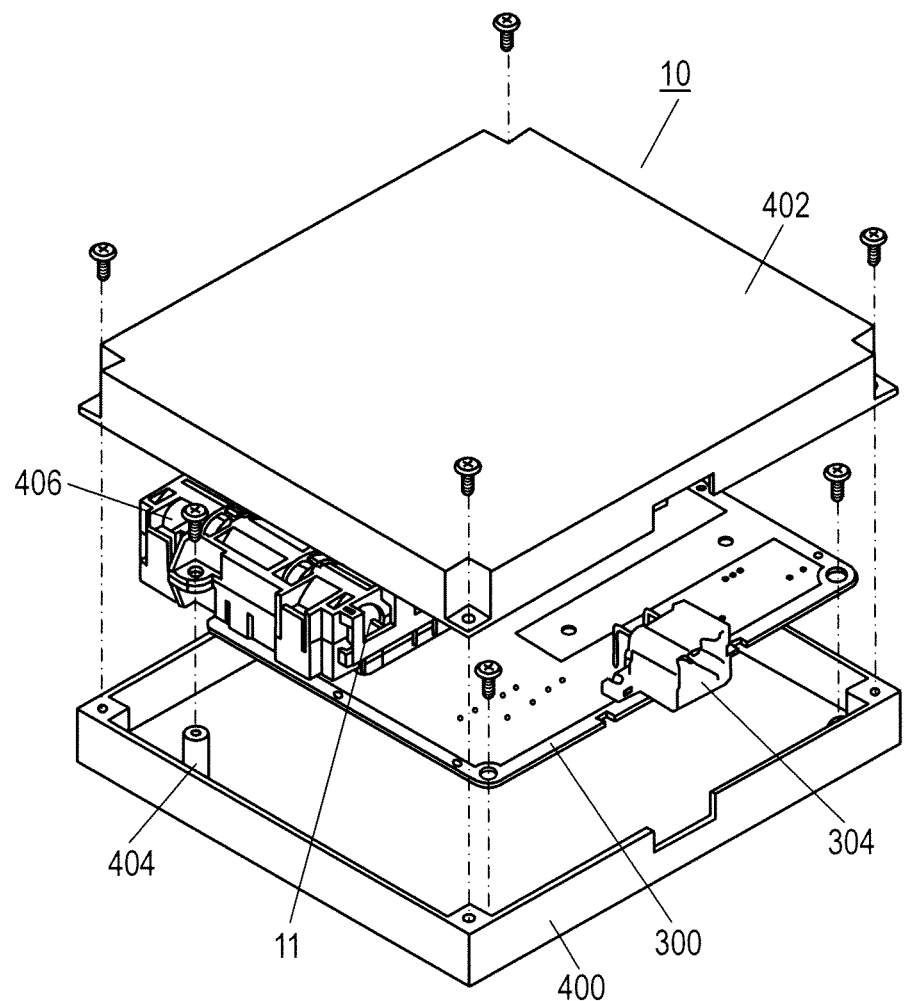
FIG. 2 is an exploded perspective view showing the capacitor module in the first exemplary embodiment according to the present invention.

FIG. 1 is an upward perspective view showing a capacitor module contained in holders in a first exemplary embodiment according to the present invention; and FIG. 2 is an exploded perspective view showing the capacitor module.

As shown in FIG. 2, capacitor module 10 includes a plurality of capacitors electrically connected to each other inside of exterior cases 400 and 402 made of an insulating resin, and thus, is adapted to accumulate electric power in a plurality of capacitors 11 from an outside power source via connector 304 so as to supply the accumulated electric power to outside loads or the like through connector 304. Wiring board 300 is provided with a control circuit for controlling the electric charging/discharging of the plurality of capacitors 11.

As shown in FIG. 1, six electric double-layered capacitors are juxtaposed in capacitor module 10, to be thus electrically connected to each other in series via wirings of wiring board 300 in the first exemplary embodiment.

Here, although the description will be given in the first exemplary embodiment by way of six juxtaposed capacitors 11, the number of capacitors 11 may be singular. In addition, capacitor 11 is not limited to the electric double-layered capacitor, but it may be an electrolyte capacitor, an electrochemical capacitor, and the like.

Next, a description will be given of the configuration of capacitor 11 with reference to FIG. 9.

Figure 9:
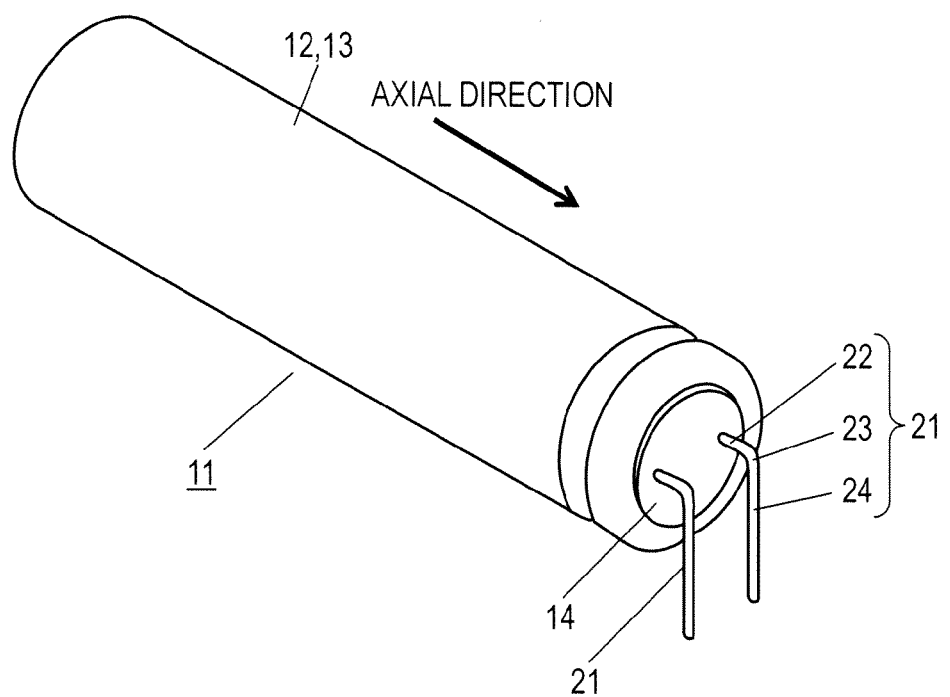
FIG. 9 is a perspective view showing the capacitor in the first exemplary embodiment according to the present invention.

FIG. 9 is a perspective view showing the capacitor in the first exemplary embodiment according to the present invention.

As shown in FIG. 9, a pair of lead wires 21 made of round rods axially projects from one end of capacitor body 12. Here, the longitudinal direction of capacitor body 12 is referred to as the axial direction.

The description is given of the first exemplary embodiment in which an electric double-layered capacitor is used as capacitor 11. The electric double-layered capacitor includes positive and negative electrodes having foil-like current collectors. Lead wire 21 is welded to the current collector, and further, the positive and negative electrodes have capacitor elements wound via a separator.

In capacitor body 12, an open end of cylindrical bottomed metallic case 13 is sealed by drawing via sealant 14 having rubber elasticity, so that metallic case 13 contains the capacitor elements and an electrolyte therein. Additionally, lead wires 21 are inserted into through holes formed in sealant 14. Here, capacitor body 12 and the metallic case are identified with each other in FIG. 9.

Lead wire 21 includes projection 22 axially projecting from capacitor body 12 and leg 24 bent at bend 23, and is formed into an L shape.

Lead wire 21 may be subjected to other processing between projection 22 and leg 24. For example, lead wire 21 may project straight, and then, horizontally extends in a V shape in the axial direction or may be slightly inclined downward.

Incidentally, capacitor body 12 may be formed into a flat or square shape in addition to the cylindrical shape.

Subsequently, a description will be given of a manner in which the lead wire is held with reference to FIG. 3.

Figure 3:
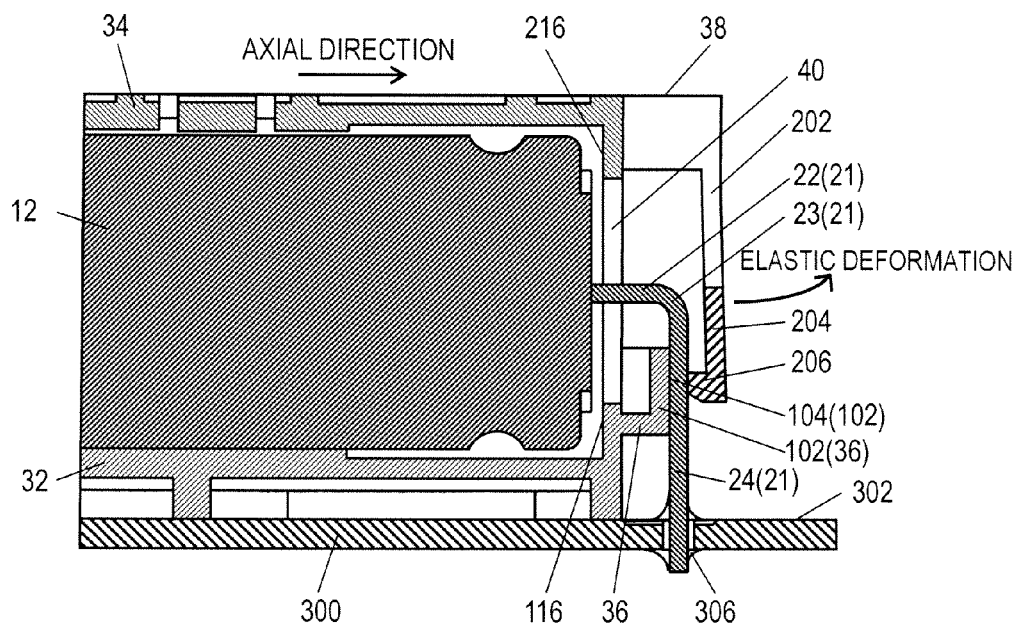
FIG. 3 is a cross-sectional view showing the capacitor module, taken along line 3-3 of FIG. 1.

FIG. 3 is a cross-sectional view showing the capacitor module, taken along line 3-3 of FIG. 1.

As shown in FIG. 3, projection 22 of lead wire 21 is axially led from capacitor body 12 through circular opening 40, and further, leg 24 of lead wire 21 is bent toward and substantially perpendicularly to board surface 302, to be thus connected to wiring board 300.

Although lead wire 21 is axially led in this embodiment, it need not always be axially led but may be led with an upward or downward inclination.

Leg 24 of lead wire 21 is inserted into a through hole formed in wiring board 300, and then, lead wire 21 is soldered to wiring board 300. Lower holder 32 is attached to wiring board 300. Upper holder 34 and lower holder 32 are fitted to each other, thereby defining a space, in which capacitor body 12 is contained.

Here, the same constituent elements shown in FIG. 3 as those described later with reference to the other drawings are designated by the same reference numerals.

Next, the structures of the lower holder and the upper holder will be described with reference to FIGS. 4 to 8.

Figure 4:
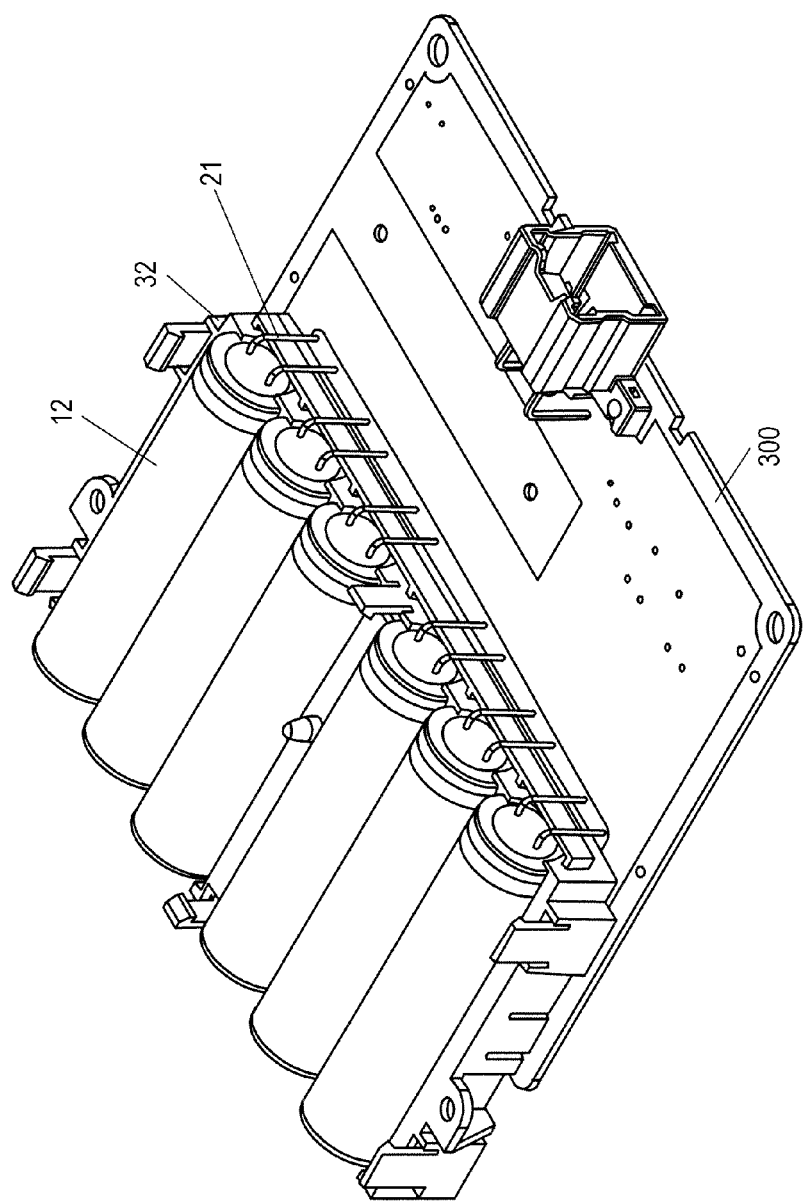
FIG. 4 is an upward perspective view showing the state in which capacitors are contained in a lower holder in the first exemplary embodiment according to the present invention.
Figure 5:
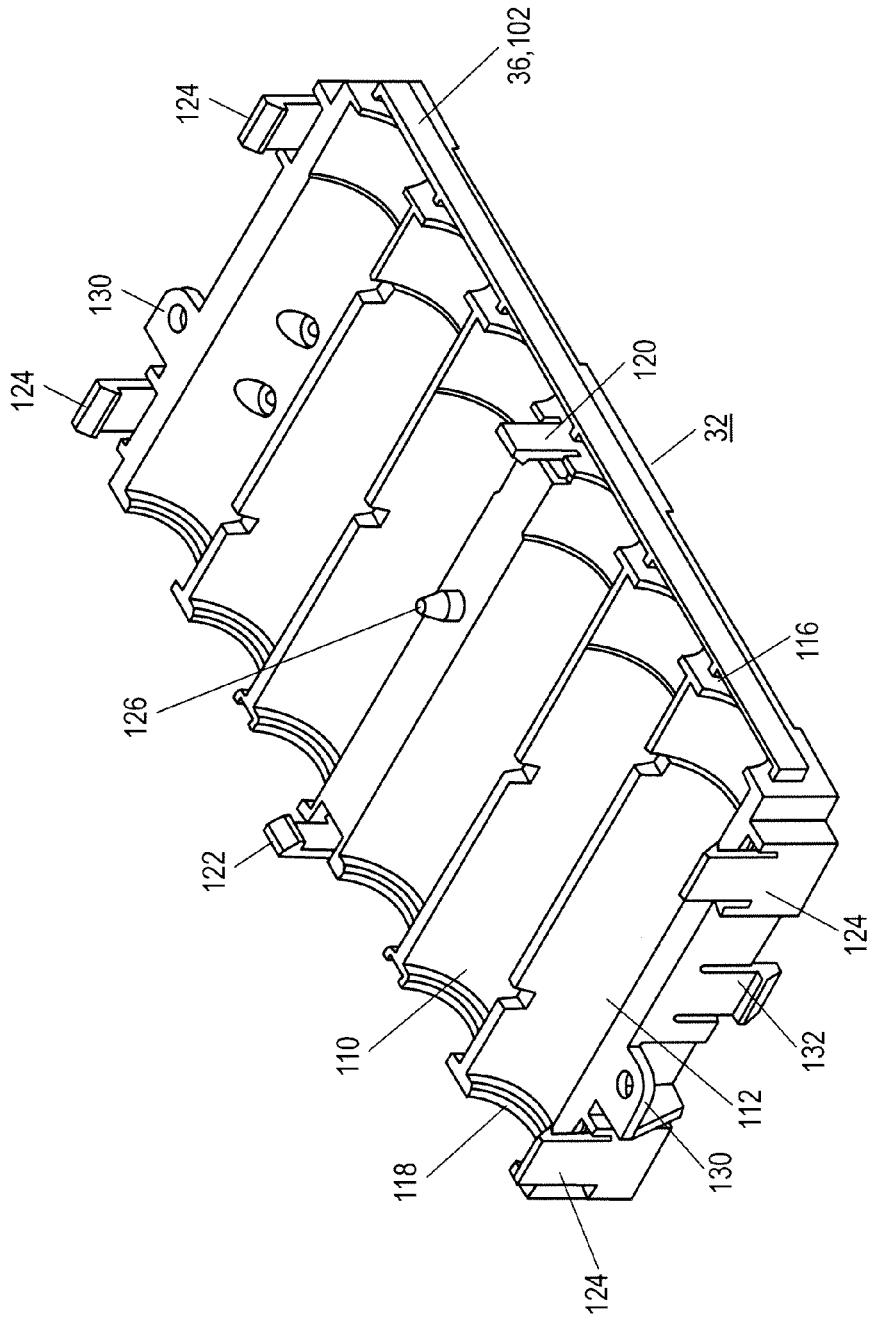
FIG. 5 is an upward perspective view showing the lower holder in the first exemplary embodiment according to the present invention.
Figure 6:
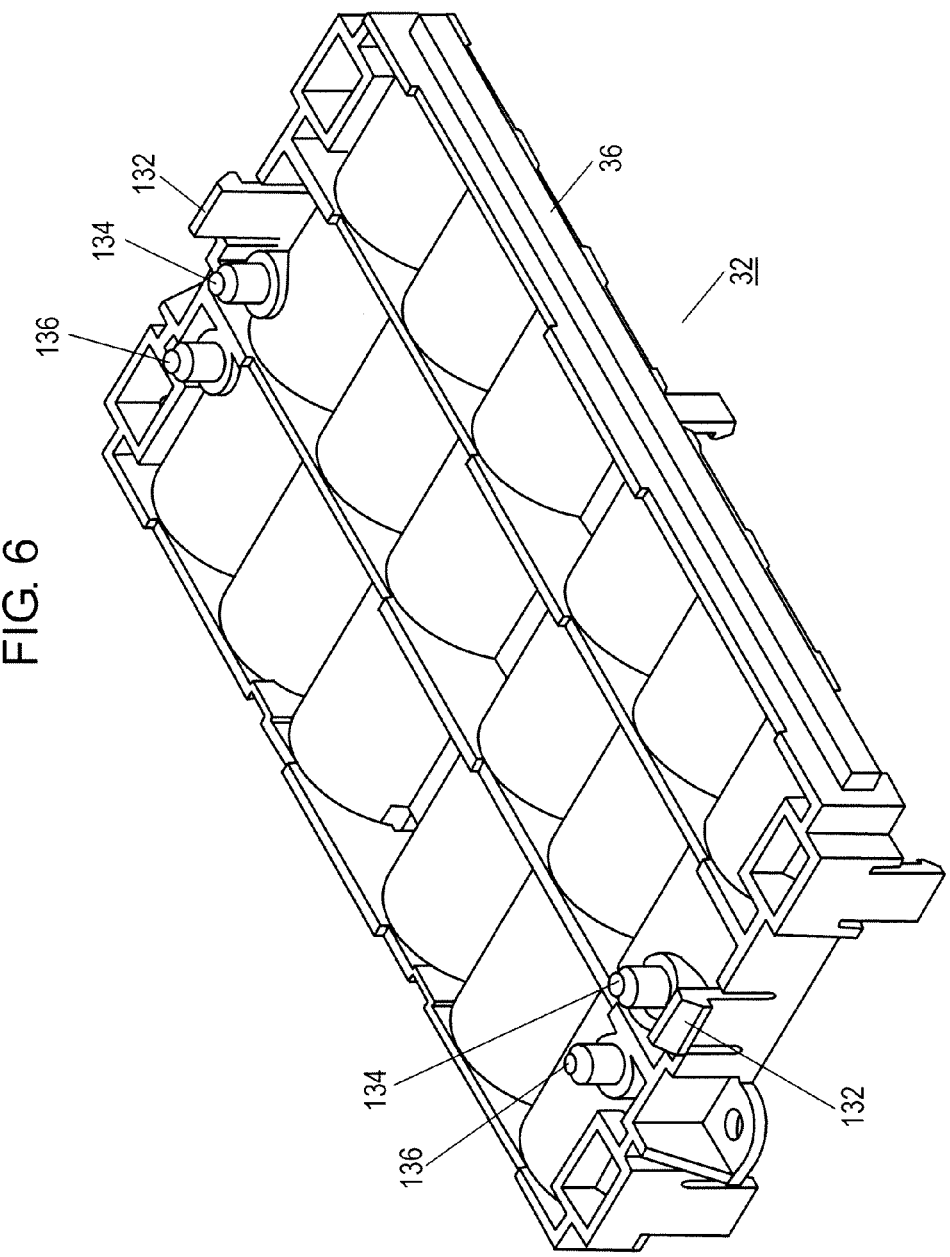
FIG. 6 is a downward perspective view showing the lower holder in the first exemplary embodiment according to the present invention.
Figure 7:
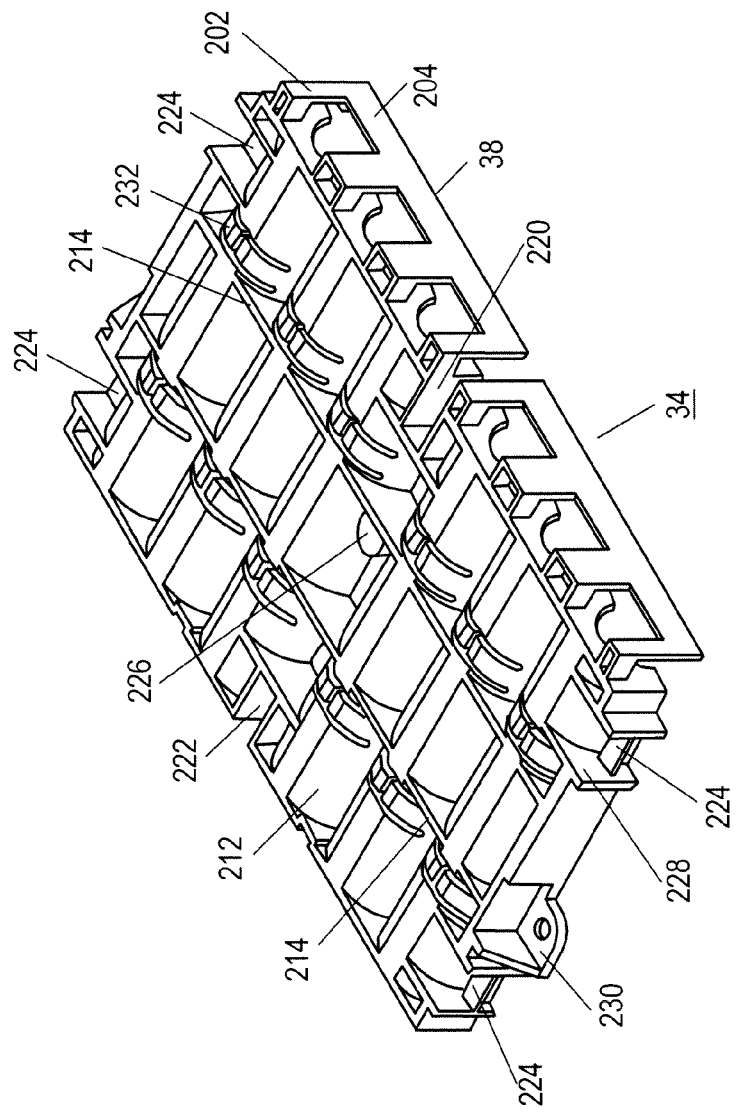
FIG. 7 is an upward perspective view showing the upper holder in the first exemplary embodiment according to the present invention.
Figure 8:
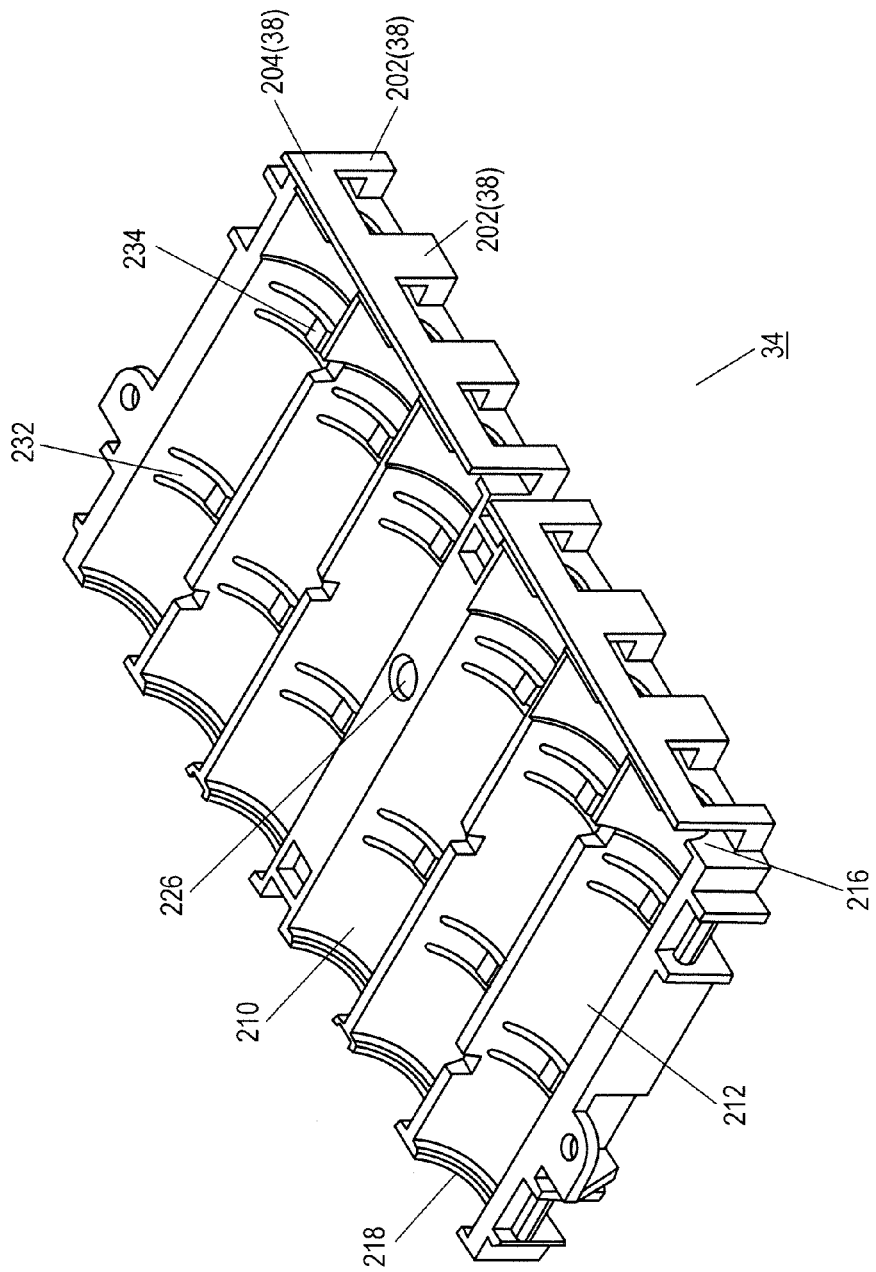
FIG. 8 is a downward perspective view showing the upper holder in the first exemplary embodiment according to the present invention.

FIG. 4 is an upward perspective view showing the state in which the capacitors are contained in a lower holder in the first exemplary embodiment according to the present invention; FIG. 5 is an upward perspective view showing the lower holder in the first exemplary embodiment according to the present invention; FIG. 6 is a downward perspective view showing the lower holder; FIG. 7 is an upward perspective view showing an upper holder in the first exemplary embodiment according to the present invention; and FIG. 8 is a downward perspective view showing the upper holder. Here, the lower holders shown in FIGS. 4, 5, and 6 are identical to each other, and further, the upper holders shown in FIGS. 7 and 8 are identical to each other. Moreover, although the capacitor is actually covered with the upper holder in the capacitor module, FIG. 4 does not show the upper holder for the sake of easy understanding of the contained state.

Lower holder 32 and upper holder 34 are made of an insulating resin. Constituents of lower holder 32 or upper holder 34 are integrally molded with the resin.

As shown in FIG. 5, lower holder 32 includes first containers 110 that contain capacitor bodies 12 in a lateral layout. As shown in FIG. 8, upper holder 34 includes second containers 210, each having presser 232 that urges from above so as to laterally press capacitor body 12.

As shown in FIGS. 5 and 8, first containers 110 and second containers 210, each having a semi-cylindrical shape, are juxtaposed perpendicularly to the axial direction.

Each of first containers 110 has U-shaped portion 112 and sides 116 and 118 whereas each of second containers 210 has U-shaped portion 212 and sides 216 and 218. The inner surface of each of U-shaped portions 112 and 212 is formed into a semi-circular shape in cross section perpendicular to the axial direction. Moreover, sides 116 and 118 are disposed at both ends of U-shaped portion 112 perpendicularly to the axial direction whereas sides 216 and 218 are disposed at both ends of U-shaped portion 212 perpendicularly to the axial direction. Additionally, the inner surface of each of sides 116, 118, 216, and 218 is formed into a semi-annular flat plate.

When lower holder 32 shown in FIG. 5 (or FIG. 6) and upper holder 34 shown in FIG. 8 (or FIG. 7) are fitted to each other, semi-annular sides 116 and 216 define circular opening 40 at an axial side surface, as shown in FIG. 3. In the same manner, semi-annular sides 118 and 218 define another circular opening on the other axial side surface.

As shown in FIG. 8, presser 232 of second container 210 is disposed in an arcuate belt-like manner at a part of the circumferential surface of U-shaped portion 212, wherein one or more pairs face each other with respect to the top of U-shaped portion 212.

Two reinforcing portions 214 are disposed in a direction in which capacitor bodies 12 are juxtaposed in such a manner as to trisect the distance between sides 216 and 218. Presser 232 of second container 210 is disposed near to one of reinforcing portions 214.

As shown in FIG. 8, projection 234 projecting inward of U-shaped portion 212 is formed at the tip of presser 232, and then, abuts against capacitor body 12.

First container 110 and second container 210 vertically hold capacitor body 12 by the effect of pressers 232 in such a manner that the axial direction of capacitor body 12 becomes substantially parallel to board surface 302 of wiring board 300.

A clearance is defined between capacitor body 12 and each of first container 110 and second container 210 except the held portions in order to enhance workability when capacitor body 12 is contained. The clearance defined between each of sides 116, 118, 216, and 218 and capacitor body 12 is designed to be greater than that between each of U-shaped portions 112 and 212 and capacitor body 12.

Lower holder 32 has first holding portion 36 whereas upper holder 34 has second holding portion 38.

As shown in FIGS. 1 and 3, first holding portion 36 and second holding portion 38 axially apply a pressing force to a part of leg 24 of each of the pair of lead wires 21.

An abutment portion of first holding portion 36 and an abutment portion of second holding portion 38 are located at the same position oppositely to the axial center of lead wire 21.

In this manner, leg 24 of lead wire 21 is urged toward capacitor body 12 so as to axially hold a part of leg 24, thus suppressing axial vibrations at leg 24 of lead wire 21 and preventing any breakage near to soldered portion 306 of lead wire 21.

Even though leg 24 of lead wire 21 is deformed due to assembling variations, the deformation of leg 24 causes a less influence on a stress to be exerted on capacitor body 12 in comparison with projection 22, thus securing excellent assembling workability while suppressing damage on capacitor 11 at the time of assembling.

As shown in FIGS. 3 and 5, first holding portion 36 of lower holder 32 is formed at the outer surface of one side 116 of first container 110, and then, extends outward with reference to the lower, left, and right portions on a lower semicircular side of circular opening 40. That is, first holding portion 36 extends reversely to the space defined by allowing lower holder 32 and upper holder 34 to be fitted to each other (i.e., the space containing capacitor body 12).

Furthermore, there is supporter 102 laterally disposed in parallel to the outer surface of side 116 in such a manner as to shield the lower semi-circuit side of circular opening 40. Here, supporter 102 extends upward in first holding portion 36. Therefore, the cross section of the holding portion is an L shape.

Supporter 102 of first holding portion 36 is located under bend 23 of lead wire 21, and further, flat portion 104 of supporter 102 is disposed perpendicularly to board surface 302, to thus abut against the pair of lead wires 21.

First holding portion 36 supports leg 24, and further, is disposed in a stationary manner to determine the arrangement position of lead wire 21. Here, the stationary state is directed to preventing elastic deformation by the urge of second holding portion 38.

In addition, first holding portion 36 is linearly continuously disposed along the outer surfaces of sides 116 of lower holder 32 in an integral manner according to the juxtaposition of capacitors 11.

As shown in FIGS. 7 and 8, second holding portion 38 of upper holder 34 is disposed at the outer surface of side 216 of second container 210, extends outward with reference to the right and left on the upper half of circular opening 40, and has a plurality of flat arms 202 extending downward. Arms 202 are connected to each other via bridge 204. In other words, bridge 204 has a flat structure for connecting the respective ends of arms 202 to each other.

As shown in FIG. 3, second holding portion 38 is disposed in such a manner that bridge 204 shields the lower half of circular opening 40 with its end orienting downward, and thus, second holding portion 38 has an L-shaped cross section.

The pair of arms 202 is elastically deformed outward at an outward extending portion as a fulcrum. Projecting presser 206 abutting against leg 24 of lead wire 21 is formed at bridge 204 on capacitor body 12 side between the pair of arms 202 (only one arm is shown in FIG. 3 being the cross-sectional view). Projecting presser 206 is designed to urge lead wire 21 by a restoring force produced by the elastic deformation of arm 202.

In order to elastically deform the pair of arms 202, the pair of arms 202 vertically extends downward and the tip of projecting presser 206 is located at a portion at which lead wire 21 is led out in a free state of no elastic deformation.

Specifically, the clearance defined between the tip of projecting presser 206 in the free state and flat portion 104 of supporter 102 is 0.3 to 0.8 times diameter R of lead wire 21. Furthermore, the distance between the tip of projecting presser 206 in the free state and board surface 302 is 0.5 to 0.7 times distance L between projection 22 of lead wire 21 and board surface 302. The clearance and the distance can achieve the optimal adjustment of the urging force, and further, prevent a breakage of arm 202 by the elastic deformation.

In this manner, second holding portion 38 is formed into a semi-frame having an opening defined by the pair of arms 202 and bridge 204. The opening of second holding portion 38 enables the visual confirmation of the abutment state between projecting presser 206 and lead wire 21 and the expansion state of sealant 14 of capacitor 11.

The pair of arms 202 of second holding portion 38 is disposed in each of capacitors 11, and then, adjacent arms 202 are connected to each other. Second holding portions 38 are integrally disposed along the outer surfaces of sides 216 of upper holder 34 continuously in a semi-ladder manner according to the juxtaposition of the plurality of capacitors 11.

In FIG. 1, although one pair of arms 202 is disposed in three capacitors 11 in connection, one pair may be disposed in one capacitor 11 without any connection.

Moreover, in the first exemplary embodiment shown in FIG. 1, the six capacitors are arranged, and therefore, the six pairs of arms are disposed. However, in the case of one capacitor, there is only one pair of arms.

As described above, first holding portion 36 of lower holder 32 includes supporter 102 projecting outward and being disposed in the stationary state: in contrast, second holding portion 38 of upper holder 34 includes bridge 204 projecting outward and being stretched between the pair of elastically deformable arms 202 so as to urge leg 24 of lead wire 21 toward capacitor body 12. This configuration facilitates the adjustment of a pressing force for holding leg 24 of lead wire 21. In this manner, vibration resistance can be enhanced, and further, the reaction force of the holding force of first and second holding portions 36 and 38 can be adjusted so that lower holder 32 and upper holder 34 can be readily fitted to each other when holders 32 and 34 are fitted to each other. Thus, it is possible to provide the capacitor module which is excellent in assembling workability and whose vibration resistance can be enhanced.

A plurality of lower fitting portions 124 and the like are disposed in lower holder 32 whereas a plurality of upper fitting portions 224 and the like are disposed in upper holder 34.

As shown in FIG. 5, lower fitting portions 120, 122, and 124 of lower holder 32 are lock claws disposed upward. Fitting portions 120 and 122 are disposed on both side surfaces in the axial direction, respectively, whereas the two pairs of lower fitting portions 124 are disposed at ends of both side surfaces in a direction perpendicular to the axial direction.

As shown in FIG. 7, upper fitting portions 220, 222, and 224 of upper holder 34 are flat locking portions that lock with the lock claws in a manner corresponding to lower fitting portions 120, 122, and 124 of lower holder 32. Restraining portions 228 for restraining the lock claw from sliding on the flat plane are disposed on both sides of the locking portion, thereby enabling the locking portions to slide between restraining portions 228 within a predetermined width. This slidability enables the reaction forces of first and second holding portions 36 and 38 to be absorbed when upper fitting portions 220, 222, and 224 are fitted to lower fitting portions 120, 122, and 124, so as to achieve the favorable assembling workability.

Additionally, as shown in FIG. 5, lower holder 32 includes lower insertion portion 126 between the pair of lower fitting portions 120 and 122 disposed at both side surfaces in the axial direction. Lower insertion portion 126 is formed into a projection including a guide portion having a conical tip and a positioning portion having a columnar bottom.

As shown in FIG. 8, upper holder 34 includes upper insertion portion 226 formed between upper fitting portions 220 and 222 in a manner corresponding to lower insertion portion 126.

Upper insertion portion 226 is formed into a recess having a columnar inner surface. Therefore, the projection of lower insertion portion 126 (shown in FIG. 5) is inserted into the recess of upper insertion portion 226. In this manner, when lower fitting portion 122 and upper fitting portion 222 on a side opposite to lead wire 21 are to be separated by the reaction force of lead wire 21 urged by second holding portion 38, the outer peripheral surface of the positioning portion of lower insertion portion 126 abuts against the inner circumferential surface of upper insertion portion 226, thereby preventing lower fitting portion 122 and upper fitting portion 222 from being unlocked from each other.

Moreover, lower insertion portion 126 and upper insertion portion 226 are disposed nearer to lead wire 21 than the centers between lower fitting portions 120 and 122 and between upper fitting portions 220 and 222, thereby enhancing the precision of distances between the abutment portion of first holding portion 36 and lower insertion portion 126 and between the abutment portion of second holding portion 38 and upper insertion portion 226, so as to stabilize the urging force against lead wire 21.

In FIG. 7, upper insertion portion 226 avoids presser 232 adjacently on a side opposite to presser 232 of upper holder 34 with respect to reinforcing portion 214 of lead wire 21.

Additionally, lower holder 32 and upper holder 34 have lower screw hole 130 and upper screw hole 230, respectively. Lower screw hole 130 is formed in the proximity of lower fitting portion 124 on side 118 opposite to first holding portion 36.

As shown in FIG. 2, lower screw hole 130 and upper screw hole 230 are superimposed with screw stopper 404 of lower exterior case 400, to be thus screwed via screw 406, so that lower holder 32 and upper holder 34 are firmly secured to each other. In this manner, the fitting work of lower holder 32 and upper holder 34 is completed.

In addition, as shown in FIG. 6, board locking claw 132 is formed downward at lower holder 32, to be thus secured to wiring board 300. Board locking claw 132 is fitted into a rectangular through hole formed in wiring board 300. Moreover, projecting board inserting portion 134 is inserted into a circular through hole formed in wiring board 300 so that lower holder 32 is positioned with respect to wiring board 300.

Additionally, case inserting portion 136 to be inserted into a boss formed at lower exterior case 400 is formed at lower holder 32, so as to define a predetermined clearance between exterior case 400 and the same.

As described above, capacitor module 10 in the first exemplary embodiment can simplify the assembling work and achieve the excellent assembling workability since lead wire 21 is held at the same time when upper holder 34 and lower holder 32 are fitted to each other.

Second Exemplary Embodiment

Figure 10:
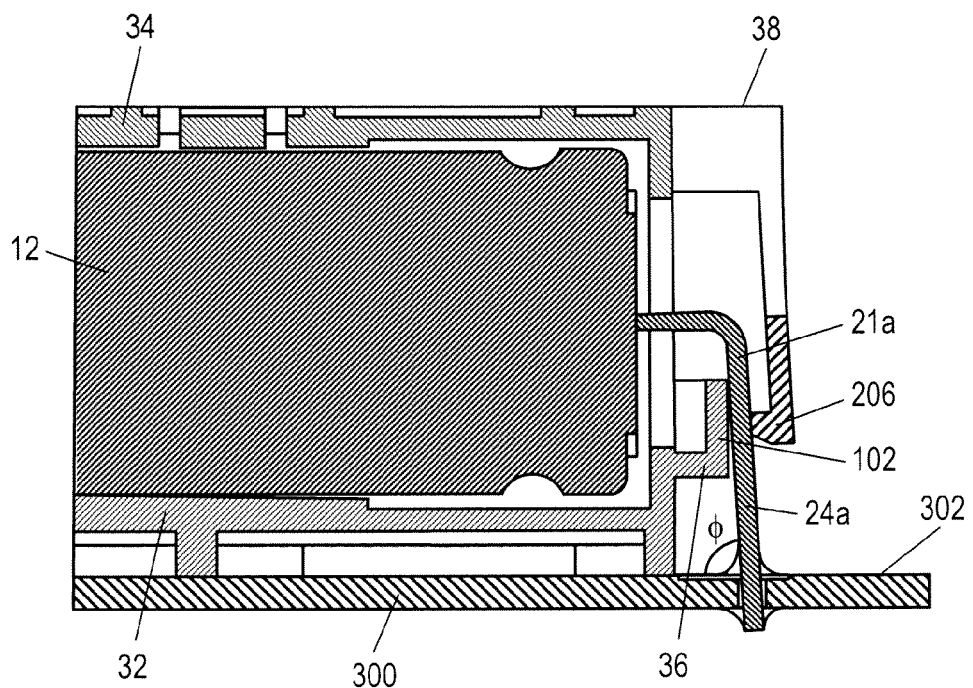
FIG. 10 is a cross-sectional view showing a capacitor module in a second exemplary embodiment according to the present invention.
Figure 11:
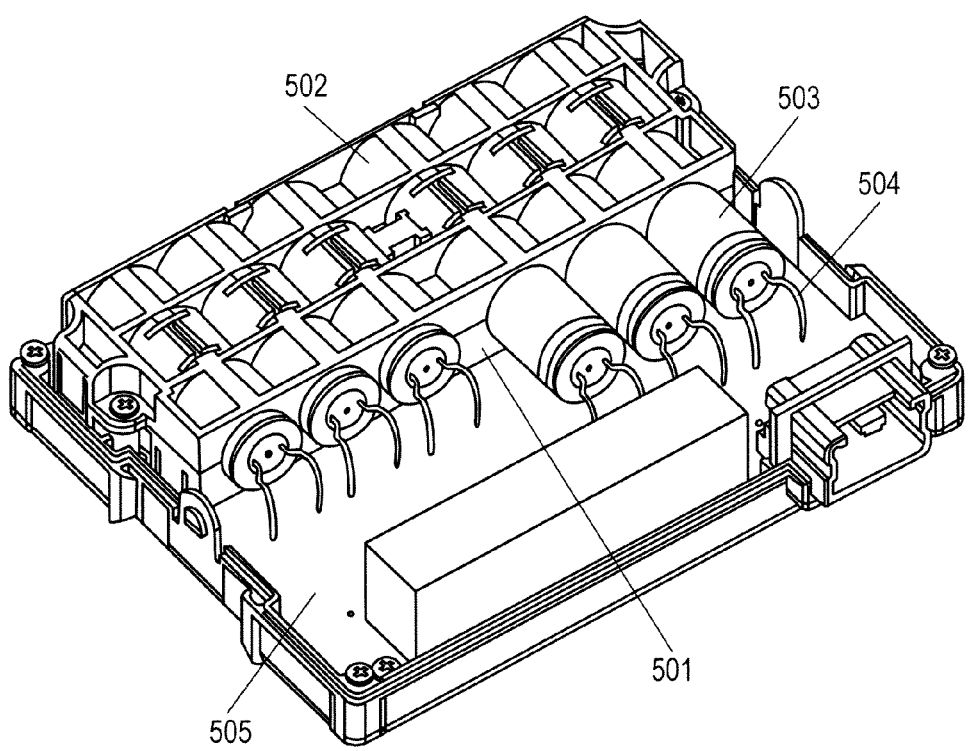
FIG. 11 is an upward perspective view showing a capacitor module contained in holders in the prior art.

A description will be given in a second exemplary embodiment with reference to FIG. 10. FIG. 10 is a cross-sectional view showing a capacitor module in the second exemplary embodiment according to the present invention. Here, the same reference numerals are assigned to the same constituent elements as those in the first exemplary embodiment, and therefore, their description will be omitted below.

As shown in FIG. 10, leg 24a of lead wire 21a is slantwise led out in such a manner as to be separated from capacitor body 12 downward of board surface 302.

In the led-out state of lead wire 21a, supporter 102 of first holding portion 36 abuts against lead wire 21a at the edge of the upper end of supporter 102, and thus, supports it. Furthermore, projecting presser 206 of second holding portion 38 abuts against leg 24a of lead wire 21a downward of the abutment portion of first holding portion 36.

In other words, a distance from board surface 302 to a point of first holding portion 36 in contact with lead wire 21a is longer than a distance from board surface 302 to a point of second holding portion 38 in contact with the lead wire.

In this manner, the abutment portion of first holding portion 36 is located at a position different from the abutment portion of second holding portion 38 with respect to the axial center of lead wire 21a, thereby further enhancing vibration resistance.

In the led-out state of lead wire 21a, it is preferable that an angle φ of a line connecting a portion connected with wiring board 300 to the abutment portion of first holding portion 36 should be 75° to 85° with respect to board surface 302.

As described above, the capacitor module in the second exemplary embodiment produces the effects of the excellent assembling workability and the enhanced vibration resistance, and is useful as a capacitor module having a capacitor fixed to a wiring board.

What is claimed is:

1. A capacitor module comprising:
   a capacitor including a capacitor body and a lead wire to be led from one end of the capacitor body;
   a holder unit having a first holding portion and a second holding portion; and
   a wiring board having a board surface, to which the holder unit is secured, wherein:
   the capacitor body is contained in a space surrounded by the holder unit,
   the lead wire includes a leg bent toward the board surface,
   the end of the leg of the lead wire is connected to the wiring board,
   the second holding portion urges the leg of the lead wire toward the capacitor body, and
   the first holding portion and the second holding portion apply a pressing force to a part of the leg of the lead wire in an axial direction of the capacitor.

2. The capacitor module according to claim 1, wherein:
   the holder unit includes a lower holder and an upper holder,
   the lower holder has the first holding portion, and
   the upper holder has the second holding portion.

3. The capacitor module according to claim 2, wherein:
  the first holding portion has a supporter extending outward from the space, and
  the second holding portion has at least one pair of elastically deformable arms extending outward from the space and a bridge connecting the arms to each other.

4. The capacitor module according to claim 2, further comprising:
  a pair of lower fitting portions formed at both side surfaces in the axial direction of the lower holder;
  a pair of upper fitting portions formed at both side surfaces in the axial direction of the upper holder;
  a lower insertion portion formed at the lower holder; and
  an upper insertion portion formed at the upper holder, wherein:
  the lower insertion portion is formed at a position nearer to the lead wire than a center position between the pair of lower fitting portions,
  the upper insertion portion is formed at a position nearer to the lead wire than a center position between the pair of upper fitting portions, and
  in a state in which the lower holder and the upper holder are fitted to each other, the pair of lower fitting portions and the pair of upper fitting portions contact each other, and further, the lower insertion portion and the upper insertion portion contact each other.

5. The capacitor module according to claim 2, wherein the leg of the lead wire is led out in a direction apart from the capacitor body toward the board surface, and
  a distance from the wiring board to a point of the first holding portion in contact with the lead wire is longer than a distance from the wiring board to a point of the second holding portion in contact with the lead wire.

\* \* \* \* \*